Patented Mar. 6, 1928.

1,661,894

UNITED STATES PATENT OFFICE.

ROBERT GRIESSBACH, OF LUDWIGSHAFEN-ON-THE-RHINE, AND KURT RÖHRE, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

MANUFACTURE OF ANHYDROUS MAGNESIUM CHLORIDE.

No Drawing. Application filed November 22, 1926, Serial No. 150,144, and in Germany December 7, 1925.

It is well known that in the dehydration of crystallized magnesium chloride by the action of heat, hydrogen chloride is split off together with the water, so that the final product is contaminated with considerable quantities of basic salts. In order to overcome this difficulty it has been proposed to drive off at least the last parts of the water in an atmosphere of hydrogen chloride. The gaseous hydrogen chloride required therefor was prepared for example from chlorine and hydrogen, or from common salt and sulfuric acid, or from aqueous hydrochloric acid. In all these cases the gas contained a high percentage of hydrogen chloride.

We have now made the surprising discovery that gas mixtures containing a low content of hydrogen chloride of about between 10 and 25 per cent can be employed in the dehydration of magnesium chloride, provided the temperature at which the drying is carried out, is suitably adapted to the content of the gas in hydrogen chloride. The heating of the magnesium chloride should take place the more slowly and the temperature should be the lower, the lower the content of the gas mixture in hydrogen chloride, whereas the temperature employed may be higher if the content of the gas in hydrogen chloride is higher. The working temperature employed ranges between about 200° and 350° C. but should not at a rule exceed 300° C.

The process according to this invention has the great advantage that gases containing hydrogen chloride resulting from other chemical operations may be employed directly. For example the waste gases resulting from the manufacture of alkali metal nitrates by the action of nitrogen oxids on alkali metal chlorides are very suitable. Preferably these gases are freed from nitrogen oxids by washing with sulfuric acid. By this method the manufacture of alkali metal nitrates according to the process just mentioned becomes particularly economical, as the high dryness of the gases produced by washing with sulfuric acid is made use of, which is not the case in the absorption of the hydrogen chloride contained in the gases by means of water hitherto in use.

The process according to our present invention may for example be carried out in the following manner: Crystallized magnesium chloride, preferably the tetra- or dihydrate, is slowly heated to between about 200° C. and 250° C. in a suitable apparatus, for example in a tower or revolving furnace, through which simultaneously the waste gases resulting from the manufacture of alkali metal nitrates from nitrogen oxid according to the above-mentioned process are passed in a continuous stream. The said temperature is maintained until the salt is completely dehydrated. Heating is advantageously effected by preheating the gases to be passed through and simultaneously externally heating the apparatus. The hydrogen chloride contained in the gases leaving the apparatus may be recovered in any suitable manner.

In a similar way other gases containing hydrogen chloride may be utilized. It should however be noted that our invention is not limited to the specific manner of working here described, but may be carried out in any other way.

The great efficiency of the process according to our present invention will be clearly illustrated by the following comparative experiments which were carried out on a laboratory scale; but quite similar results are obtained when working on an industrial scale.

A vertical electrically heated furnace is supplied with about 90 grammes of magnesium chloride tetra-hydrate obtained by dehydrating the hexa-hydrate at 105° C. A mixture of nitrogen and hydrogen chloride gas, which is dried by means of sulfuric acid and corresponds to the waste gases obtained according to the above-mentioned process for the production of alkali metal nitrates, or, for the purpose of comparison, pure nitrogen is passed through the furnace from below at different temperatures. The following figures are observed:

| Gas passed through the furnace | 100% $N_2$ | | 90% $N_2$ 10% HCl | | 80% $N_2$ 20% HCl | |
|---|---|---|---|---|---|---|
| Temperature within the furnace | 200° | 300° | 200° | 300° | 200° | 300° C. |
| Percentage of water in the final product | 15.1 | 15.0 | 2.0 | 12.4 | 1.4 | 4.9 |
| Percentage of magnesium present as magnesium oxid | 17.8 | 15.5 | 3.2 | 4.7 | 1.3 | 5.3 |

The figures indicating the percentage in magnesium oxid include the content of the basic salts in magnesium oxid.

It results clearly from the above figures that when the content of the gas in hydrogen chloride becomes higher, the dehydration of magnesium chloride can be carried out in a higher degree without the content of magnesium chloride in the final product also becoming higher. Thus, for example, when a gas containing 10 per cent of hydrogen chloride and a temperature of 200° is employed, a product is obtained still containing about 2 per cent of water and having a magnesium oxid content of 3.2 percent. If however a gas containing 20 per cent of hydrogen chloride is employed at the same temperature of working, a product is obtained, which only contains about 1.4 per cent of water, that is to say in which the dehydration has progressed to a higher degree, and which in spite of this contains a smaller percentage of magnesium oxid, namely only 1.3 instead of the 3.2 per cent, found according to the former observation. On the other hand, the drying temperature may be the higher, the higher the percentage of the gas mixture in hydrogen chloride. For example, at a temperature of working of 200° C. a product is obtained containing 2 per cent of water and 3.2 per cent of magnesium oxid when a gas is employed containing 10 per cent of hydrogen chloride, whereas when the same gas is employed at a temperature of 300° C. a product is obtained, which although it has only been dried to a water content of 12.4 per cent already contains 4.7 per cent of magnesium oxid. If the dehydration is continued further, the content in magnesium oxid becomes even higher. If however a gas containing 20 per cent of hydrogen chloride instead of 10 per cent of the same is employed at a temperature of 300° C., the content in water of the product may be reduced to 4.9 per cent without the content of magnesium oxid becoming higher than 5.3 per cent. As a high drying temperature is desirable from an economical point of view, a most favorable temperature can be found out in each case at which drying takes place as rapidly as possible without the final product containing more magnesium oxid or basic salt than desired.

We claim:

1. The process of producing anhydrous magnesium chloride which consists in treating crystallized magnesium chloride in a current of a gas mixture containing about between 10 and 25 per cent of hydrogen chloride at a temperature of about between 200° and 350° C., the drying temperature employed being lower within the range specified, the smaller the content of hydrogen chloride in the gases.

2. The process of producing anhydrous magnesium chloride which consists in treating crystallized magnesium chloride in a current of a gas mixture obtainable by washing with sulfuric acid the waste gases resulting from the manufacture of alkali metal nitrate from alkali metal chloride and nitrogen oxids, at a temperature of about between 200° and 350° C., the drying temperature employed being lower within the range specified, the smaller the content of hydrogen chloride in the gases.

In testimony whereof we have hereunto set our hands.

ROBERT GRIESSBACH.
KURT RÖHRE.